Figure 5:
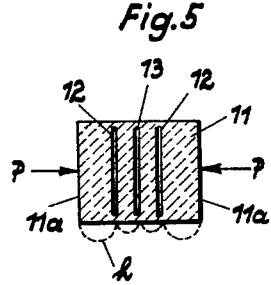

July 9, 1963     H. SERNETZ     3,097,026
RESILIENT MOUNT FOR LOAD-CARRYING ANTI-FRICTION BEARINGS
Filed July 28, 1961     3 Sheets-Sheet 1
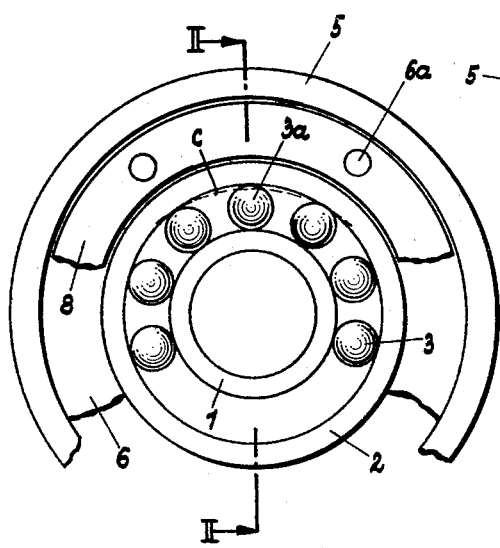
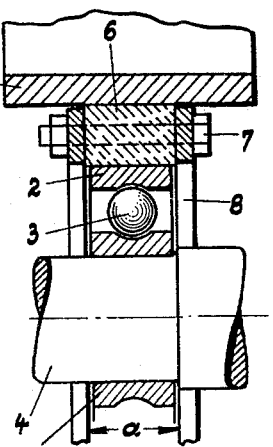
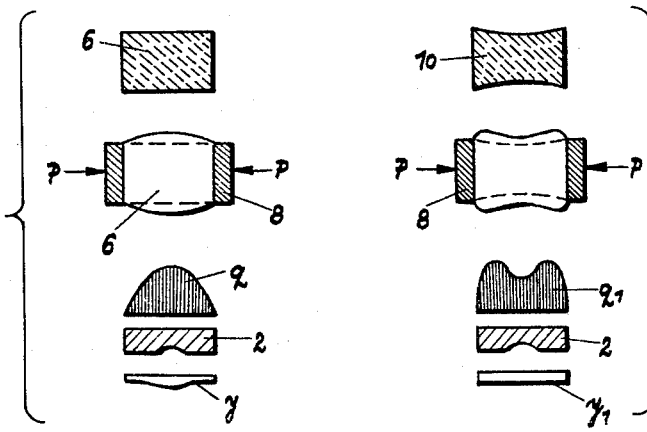
Inventor HEINZ SERNETZ
by
Attorneys July 9, 1963 H. SERNETZ 3,097,026
RESILIENT MOUNT FOR LOAD-CARRYING ANTI-FRICTION BEARINGS
Filed July 28, 1961 3 Sheets-Sheet 2

Inventor HEINZ SERNETZ
by
Byerly, Townsend, Watson + Churchill
Attorneys

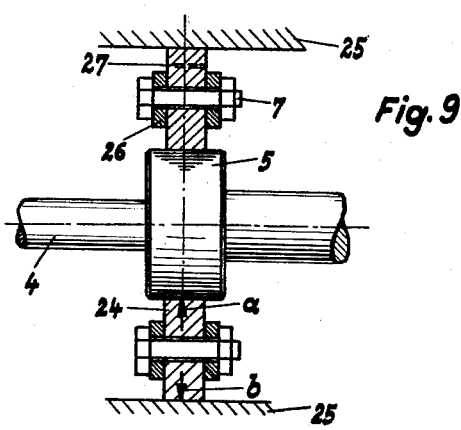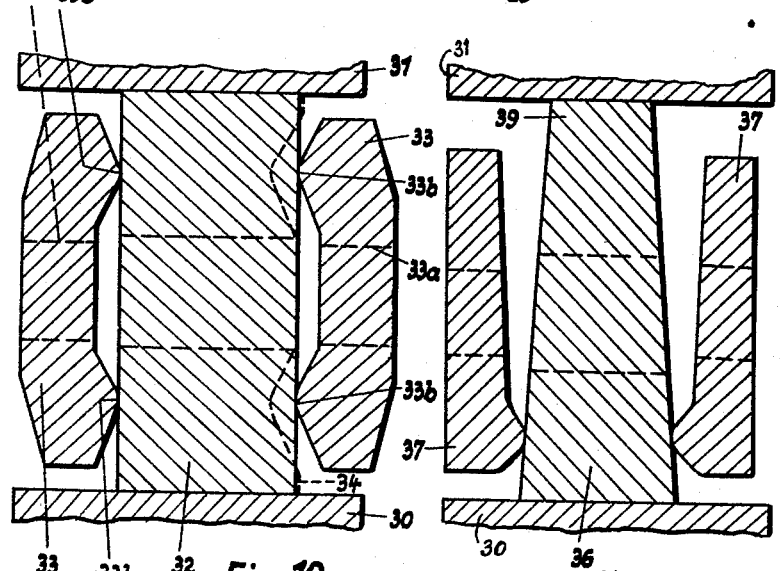

United States Patent Office 3,097,026
Patented July 9, 1963

3,097,026
RESILIENT MOUNT FOR LOAD-CARRYING
ANTI-FRICTION BEARINGS
Heinz Sernetz, Alte Poststrasse 98, Graz-
Eggenberg, Austria
Filed July 28, 1961, Ser. No. 127,670
Claims priority, application Austria Aug. 12, 1960
9 Claims. (Cl. 308—184)

The present invention provides a resilient mount for anti-friction bearings. In this connection the term "mount" refers to means which provide such a support for the anti-friction bearing that the outer race of the anti-friction bearing is connected by an annular member of resilient material to the frame or other machine part which carries the bearing rather than to a support carried by a practically non-yielding machine part, as is the case in most instances at the present time. Such a resilient mount can increase the load capacity of the bearing because it provides for a more uniform distribution of the load. According to the invention the resiliently deformable intermediate member disposed between the outer race of the anti-friction bearing and the machine part carrying this bearing has a special shape and is pre-stressed to provide for special additional results, as will be set forth hereinafter.

Resilient intermediate members which are inserted between the anti-friction bearing and its support are known but according to the prior art are inserted only under a small initial stress, as can be achieved during assembly. Owing to the low pressure by unit area in the bearing mount such assemblies cannot transmit the load which corresponds to the load capacity of the rigidly fitted bearing and for this reason they cannot increase the load capacity of bearings of this type. Only a resilient support is actually achieved so that the usefulness of such assemblies is restricted to special cases, where movements of the bearing under the influence of the load are tolerable.

In connection with pulleys for conveyor belts it has already been proposed to provide between the outer race of the load-carrying anti-friction bearing and the periphery of the pulley a resilient intermediate member, which is under axial initial compressive stress produced, for instance, by tie bolts. In this case, however, no care is taken to have the outer race of the anti-friction bearing directly engage the resilient intermediate member but the outer race engages a pair of shells, which are axially forced together to deform the resilient ring, which is spaced from the outer race of the anti-friction bearing, so that this ring is clamped between said shells and the inside periphery of the carrying roller. Since these shells bear directly on the outer race of the anti-friction bearing and support the same, they form a more or less rigid support for this race. The load resistance of an anti-friction bearing can only be increased, however, if an adequate load capacity of the outer support of the anti-friction bearing is retained and nevertheless the outer race of the anti-friction bearing is rendered yieldable to some extent in the direction of the bearing load, i.e., transversely to the axis of the bearing. This will only be the case if a resilient support of the outer race of the anti-friction bearing is provided for.

Such a deformation of the outer race has the practical result that more rolling elements can be used for transmitting the bearing load from the shaft carried by the bearing to the frame of the machine or another element of construction which takes up the pressure than where such deformation does not take place. It may be imagined that the outer race hugs, as it were, the envelope of the rolling elements. Thus, the combination of a resilient member directly engaging the outer race of the anti-friction bearing with the possibility of maintaining the same under sufficient axial pressure results in a substantial increase in the load capacity of the bearing in addition to the mere shock absorption provided by the known resilient design.

The tie bolts required in anti-friction bearing assemblies of the kind under discussion here act on the resilient intermediate members by means of thrust members, which are in most cases ring-shaped.

Due to the friction between the engaging surfaces of the pre-stressing members and the resilient intermediate members, pressure will always build up over the outer race of the anti-friction bearing and will tend to deform the resilient intermediate members in the shape of a barrel. There will necessarily be a stress variation over the outer race of the anti-friction bearing. The maximum will always occur at the centre of the outer race and the stress will decrease to zero towards the rim. Beside the fact that this involves an undesirable loading of the resilient intermediate member and the pre-stressing means, the initial stress will cause a deformation of the outer race of the ball bearing itself. This is subjected to the greatest initial stress in that region where it has the smallest cross-sectional area owing to the provision of the bearing groove whereas in the rim zones, where the ring has a large thickness, the initial stress approaches zero. This gives rise to transverse bending stresses in the outer race of the anti-friction bearing and the cross-sectional shape of the outer race does not remain flat. Particularly in self-aligning ball and roller bearings this results in a substantial disturbance of the running characteristics and the load is no longer equally distributed to both runways.

The actual useful load on the bearing will then impute an additional load on the bearing mount with approximately the same pressure distribution so that the above-mentioned deterioration of the accuracy of running will be intensified.

To minimize this undesired additional transverse deformation of the outer race and thus to ensure that the running characteristics of the anti-friction bearing operating under increased load will be adversely affected to the least degree, the invention teaches to provide an intermediate member, which is deformed, as is known per se, by being compressed in the axial direction by means of tie bolts and coacts directly with the outer race of the anti-friction bearing, and which has such a profile and/or consists of such a material that when axially compressed it will exert on the outer race of the anti-friction bearing a pressure which when considered in an axial sectional view over the outer boundary of this outer race, exhibits such a non-linear variation that pressure maxima occur adjacent to the end faces of the outer race and a pressure minimum occurs in the intermediate portion of this race. In consideration of the cross-sectional shape of the outer race of the ball bearing this will ensure that the same will be subjected to a uniform compressive stress so that transverse bending will be avoided.

The diagrammatic drawings show illustrative embodiments of the invention. FIG. 1 and the corresponding side view shown in FIG. 2 as a sectional view taken on line II—II of FIG. 1 as well as FIGS. 3 and 4 provide a general explanation of the basic idea of the invention. FIGS. 5–8 show various possibilities of carrying out the invention, in views substantially restricted to the resilient intermediate members, which are shown in section. FIGS. 9–11 serve to illustrate a further development of the invention.

FIGS. 1 and 2 show an anti-friction bearing which consists of the inner race 1, the outer race 2 and the rolling elements 3 and together with a resilient intermediate member 6 connects the shaft 4 to the part 5 which carries the bearing. The resilient intermediate member 6 is axially compressed by means of tie bolts 7, which extend through the holes 6a and which act on the intermediate member 6 by means of thrust rings 8.

With reference to FIG. 1 it may be assumed first that parts 1, 2, 3 are rigid and the intermediate member 6 is rigid too. The ball 3a will then have to transmit substantially the entire load which is assumed to act vertically on the bearing. The conditions are practically improved in that the ball 3a is resiliently flattened to some extent under the load and is slightly forced into the race so that the adjacent balls are also slightly deformed and participate in transmitting the load on the bearing. The resulting distribution of the effective useful load is unsatisfactory. It might be substantially increased if part 6 consists of resilient material so that it permits of a substantially elliptical deformation of the outer race 2 and the same can engage a large number of rolling elements with almost the same force without causing the latter to become impressed into the bearing groove of the outer race; this will substantially increase the load capacity of the bearing. Features of this character form the basic subject matter of this patent.

Whereas the above-mentioned features permit of a substantial increase in the load capacity of the anti-friction bearing, they do not permit of utilizing further possibilities, inherent in the design, of increasing the bearing load and it has been found that the following facts are decisive for this restriction:

The distribution of pressure under the useful load of the bearing is similar to the distribution of pressure under the axial prestressing force. FIG. 3 shows this distribution of pressure for an intermediate member 6 which has a rectangular cross-section and which is under the initial axial stress P imposed by means of the prestressing ring 8. Under the initial axial stress the cross-section of the ring 6 is deformed like a barrel so that a load line $q$ is built up over the outer race 2 of the bearing. As a result the race 2 bends in the transverse direction approximately in accordance with the resilient line $y$. This transverse curvature of the bearing ring deteriorates the running characteristics of the anti-friction bearing.

FIG. 4 shows the resilient intermediate ring 6 which is profiled according to the invention and which when subjected to an initial stress P builds up a load line $q_1$, which is more in accordance with the cross-sectional shape of the outer race so that it does not cause a disturbing transverse deformatioin thereof. The resilient line $y_1$ is then approximately straight.

Because the useful load on the bearing is mainly taken up by arch action by means of the ring if resilient mounts are employed, the same remarks as have been set forth hereinbefore regarding the transverse bending of the outer race of the ball bearing and the resulting influences on the running characteristics of the anti-friction bearing apply also to this useful load on the bearing. A further result of the pressure distribution according to FIG. 3 resides in that the system comprising the intermediate member 6 and the race 2 is in a state of unstable equilibrium because deformation energy is released during each tilting movement as only unloaded rim zones of the resilient intermediate member are subjected to higher pressure whereas the highly loaded intermediate zone is relieved from stress. Where the pressure is distributed according to FIG. 4, this difficulty is avoided owing to the higher pressures acting in the outer zones. Due to these difficulties the load capacity of the anti-friction bearing cannot be utilized more fully in accordance with the above-mentioned prior proposals. Thus, the present invention resides substantially in that a resilient bearing mount is inserted between the machine part and the outer race of the anti-friction bearing and this mount is so shaped that when it is subjected to the required initial stress the pressure distribution over the axial extent of the outer race is such that increased pressures occur in the rim zones whereas the inner zone remains under a smaller load. For this purpose, the resilient intermediate member 10 shown in cross-section in FIG. 3 has a profile which when subjected to pressure in the direction of the arrows P applies to the outer race 2 a load which follows approximately the line $q_1$. In addition to the increase in the safe load on the bearing which is now possible, the incorporation of the ball bearing into the resilient bearing mount according to the invention permits of a compensation of all dismensional tolerances so that the difficulties are overcome which are involved in the manufacture of the ball bearing seats. It is quite in accordance with the invention that in this case the bore in the machine element 5, FIGS. 1 and 2, and the outer race 2 of the anti-friction bearing, are not subjected to further machining, which results in a reduction in cost.

The bearing mount according to the invention is further capable of protecting the anti-friction bearing from impact to the highest possible degree. Furthermore, vibration in a radial direction is prevented by the high initial stress imposed on the bearing. On the other hand, a movement of the bearing in an axial direction, as may be required, e.g., for taking up thermal expansion, is quite possible independently of the high initial stress because this is substantially determined only by the shearing strength of the transition zone between the mount and the machine part.

The increased compressive stresses in the rim zone ensure that the bearing will resist tilting.

To prevent a relief of stresses in the angular range between the stressing ring and the outer race of the anti-friction bearing, the resilient mount may be partly drawn inwardly over the outer race and is subjected to substantial pressure in an axial direction by the stressing device, which is also radially inwardly extended. This pressure acts between the lateral boundary of the outer race and the tightening disc.

FIG. 5 shows another resilient intermediate member 11 according to the invention. This intermediate member has a rectangular profile when it is not loaded and contains two sheet metal inserts 12 spaced from the end faces 11a and from the symmetry plane extending at right angles to the axis of the intermediate member. The sheet metal inserts may be integral with the rubber member 11. A third insert 13 of this kind is disposed in said plane of symmetry. Since the distances between these inserts differ, a load exerted by forces P will result in a distribution of forces according to line $h$, with minimum values in the planes of the inserts 12, 13.

Figure 6:
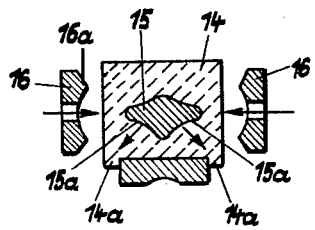

The resilient annular member 14 of FIG. 6 comprises elongation-resisting inserts 15, suitably of metal, the profile of which provides thrust faces 15a, which cause the rim portions of the intermediate member 15 to yield more than the inner part toward the outer race of the anti-friction bearing when the intermediate member is subjected to pressure P in the axial direction of the anti-friction bearing.

It may be suitable in accordance with the basic concept of the invention to provide an intermediate member which behaves like a non-homogeneous resilient member when considered in the radial direction so that there is a variation in its axial compressive stress considered over its radial extent and in its resilient characteristics. To achieve this, thrust members 16 might be used which are urged against the intermediate member 14 with profiled end faces 16a, as shown in FIG. 6, rather than with plane end faces.

Figure 7:
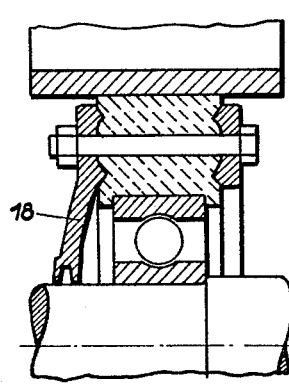
Figure 8:
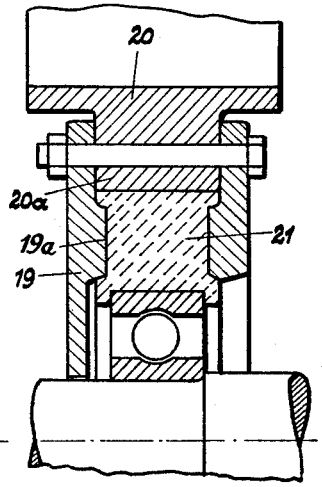

FIG. 7 shows a mount according to the invention in which the thrust rings 18 form bearing covers. FIG. 8 shows a modification of this idea inasmuch as the resilient members are not passed through by tie bolts but a thrust ring 19 forming a bearing cover is bolted to an extension 20a of the carrying part 20 and acts on the resilient intermediate member 21 by an extension 19a. The same applies to the second thrust ring.

A further improvement of the anti-friction bearing mount according to the invention will be obtained if the resilient intermediate members compressed in the axial direction behave like non-homogeneous resilient members at least in a radial direction so that there is a variation in their axial compressive stress, considered over the radial extent of these transmitting members, as well as in the resilient characteristics thereof. For a more detailed explanation of this aspect of the invention, reference is made to FIGS. 9–11. FIGS. 10 and 11 are sectional views showing details of intermediate members of the last-mentioned kind and of their thrust parts.

According to FIG. 9 the ball bearing having an outer race 5 shown in elevation is fitted on a shaft 4 and connected by a rubber ring 24 to the fixed carrying part 25. For this purpose, the ring 5 is axially compressed by tie bolts 7 and thrust rings 26 with the result that it exerts pressure in the direction a, b on the parts 5 and 25, which are bridged by the ring 5.

According to the previously accepted theory, such a rubber member subjected to the compressive stress illustrated will be similar in behaviour to a liquid, i.e., the pressure exerted by the annular member on the surfaces engaged thereby should be approximately equal at all points. As has been set forth hereinbefore in conjunction with FIGS. 3 and 4, this assumption is not correct. Whereas a and b may be considered equal if the cross-section is rectangular and the thrust rings 26 are centrally disposed, this is not due to the symmetrical arrangement chosen rather than because a rubber member subjected to pressure would behave like a liquid, which it does not. On the other hand, the equality of a and b, FIG. 9, is not an advantage. On the contrary, the substantial difference between the areas of the two surfaces engaged by the rubber ring on the inside and outside and difference between the fits or pressures required on the inside and outside would require a much larger pressure per unit area on the inner race. Furthermore: If it is desired that the shaft 4 should retain a certain freedom of axial movement relative to the bearing mount, the ring must be still sufficiently movable in the axial direction in some region and since the pressure per unit of area under which the intermediate member 24 engages the part 25 may be less than between the intermediate member 24 and the anti-friction bearing, this freedom of movement should suitably exist in the range between the periphery of the thrust ring 26 and the carrying part 25. It will be apparent from the above that a rubber member which actually behaved like a liquid body when subjected to pressure would be a failure in every respect. Although this assumption regarding behaviour is not confirmed in practice, the actual behaviour is by no means satisfactory and will give satisfactory results only in very rare, extremely simple cases. On the other hand, it will be appreciated that more favourable conditions will be obtained in accordance with the invention if the member 24 behaves like a non-homogeneous resilient member also in the radial direction. For instance, if an elongation resisting insert, such as of linen or wire, was embedded in the member 24 at 27, this insert will obviously result in a reduction of the pressure exerted by the member 24 on the carrying part 25. At the same time such an insert would have the result that that portion of the member 24 which is disposed outside the insert 27 remains softer. This is of advantage for the performance of the above-mentioned axial movement.

Similar effects can be achieved with a simpler structure if according to a feature of the invention at least one thrust ring 26 is so designed that its end face acting on the resilient intermediate member has a curved generatrix and this curvature causes the ring 26 when compressed to exert pressure on the rubber member 24 in such a manner that there is a variation in its pressure distribution and resilient characteristics, considered over its radial extent. It is thus possible with simple means to ensure over this radial extent any distribution of pressure which may be required for the bearing in any specific case. This may be achieved merely by giving the thrust ring an appropriate profile. It is also possible within the scope of the invention to adopt additional measures which promote this aim, such as the profiling of the intermediate member described hereinbefore, the use of elongation-resisting inserts, etc.

FIG. 10 shows the inside surface 30 and the outside surface 31 corresponding to members 5 and 25 of FIG. 9, the intermediate member 32 and the thrust rings 33, the thrust bolts of which are not shown but should be imagined to act through the holes 33a. The thrust rings 33 have a non-rectangular cross-section and are formed on the inside and outside with a protruding ridge or bead 33b, which causes the intermediate member 32 to be deformed mainly in the outer or peripheral ranges. A ring 33 penetrating into the intermediate member 32 deforms the former approximately according to line 34 while forming peripheral zones of increased pressure whereas the central part of the intermediate member 32 is under smaller axial pressure.

In the illustrative embodiment shown in FIG. 11 the rubber ring 36 has a slight outward taper. The rings 37 terminate at a larger distance from part 31. This results in a strong pressure being exerted on the intermediate member 36 close to part 30, which is assumed to correspond to the carrying part 25 of FIG. 9 and a low pressure being exerted close to the part 31, and the formation of a fairly large zone 39 of lower pressure so that this bearing assembly is capable of yielding substantially both in the axail and radial directions.

What is claimed is:

1. A resiliently mounted load carrying anti-friction bearing structure having an outer bearing race and a supportnig sleeve, and including
    a resilient intermediate member disposed between said bearing race and said sleeve and adapted to exert pressure thereon in inward and outward radial directions;
    a pair of thrust rings located at opposite sides of said intermediate member; and
    tie bolts extending through said thrust rings and adapted to draw said thrust rings toward each other;
characterized in that the intermediate member is deformed by being subjected to pressure in the axial direction by said thrust rings to grip the outer bearing race directly, and when axially compressed exerts a pressure on said outer bearing race which when considered in an axial sectional view over the outer boundary of the outer race exhibits such a non-linear variation that pressure maxima occur close to the ends of the outer bearing race and a pressure minimum occurs in the intermediate portion of said race.

2. The antifriction bearing structure of claim 1 in which the intermediate member is an annulus composed of uniform resilient material and is provided with an inner face, concave in cross-section, which grips the outer face of the antifriction bearing.

3. The antifriction bearing structure of claim 1 in which the intermediate member is an annulus composed of resilient material and is provided with at least two inserts of inelastic material in the form of annular sheet metal discs which are spaced from the end faces, and from the vertical plane of symmetry which is at right angles to the axis of, the intermediate member.

4. The antifriction bearing structure of claim 1 in which the intermediate member is an annulus having elongation resisting inserts which cause the rim portions of the intermediate member to move toward the outer race of the antifriction bearing more readily than the inner portion of the intermediate member when said intermediate member is subjected to pressure along the axis of the bearing.

5. The antifriction bearing structure of claim 1 in which the intermediate member is an annulus having inwardly projecting flange-like extensions overlapping the outer race of the antifriction bearing.

6. The antifriction bearing structure of claim 1 in which the intermediate member behaves as a non-homogeneous resilient member in a radial direction so that there is a variation in its axial compressive stress considered over its radial extent, and in its resilient characteristics 7. The antifriction bearing structure of claim 6 in which each end face of the intermediate member and the face of the thrust ring axially compressing the same have a generatrix which is so curved that the pressure exerted by the rings varies over their radial extent.

8. The antifriction bearing structure of claim 1 in which one of the thrust rings provides a cover for an end of the antifriction bearing.

9. The antifriction bearing structure of claim 1 in which the supporting sleeve includes an annular extension against which the outer rims of the thrust rings are tightened to determine the highest possible compression of the intermediate member.

References Cited in the file of this patent

UNITED STATES PATENTS 2,865,689    Anderson _____ Dec. 23, 1958